(12) United States Patent
Herczeg

(10) Patent No.: US 11,458,835 B2
(45) Date of Patent: Oct. 4, 2022

(54) COVER APPARATUS FOR A MOTOR VEHICLE BODY

(71) Applicant: Dr. Ing. h.c. F. Porsche Aktiengesellschaft, Stuttgart (DE)

(72) Inventor: Gabor Herczeg, Leimen (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 302 days.

(21) Appl. No.: 16/846,702

(22) Filed: Apr. 13, 2020

(65) Prior Publication Data
US 2020/0324646 A1    Oct. 15, 2020

(30) Foreign Application Priority Data

Apr. 12, 2019   (DE) ................. 10 2019 109 713.4

(51) Int. Cl.
*B60K 15/05*    (2006.01)
*B60L 53/16*    (2019.01)

(52) U.S. Cl.
CPC ............. *B60K 15/05* (2013.01); *B60L 53/16* (2019.02); *B60K 2015/0507* (2013.01);
(Continued)

(58) Field of Classification Search
CPC ............ B60K 15/05; B60K 2015/0507; B60K 2015/0515; B60K 2015/0523;
(Continued)

(56) References Cited

U.S. PATENT DOCUMENTS 6,231,106 B1   5/2001  Nagasaka
8,089,228 B2   1/2012  Ballard
(Continued)

FOREIGN PATENT DOCUMENTS

CN    101666193    3/2010
CN    101994446    3/2011
(Continued)

OTHER PUBLICATIONS

Rossmann, "Displacement mechanism for a movable body part and covering device with such a displacement mechanism", Published Jan. 24, 2019, European Patent Office, Edition: DE102017212397A1 (Year: 2019).*

(Continued)

*Primary Examiner* — Dennis H Pedder
*Assistant Examiner* — Joyce Eileen Hill
(74) *Attorney, Agent, or Firm* — Gerald E. Hespos; Michael J. Porco

(57) ABSTRACT

A cover apparatus for a motor vehicle body has a movement device (5) with first and second guide rails (8, 9) that are spaced from one another and received rigidly on the motor vehicle body (2). A covering element (4) covers a filling connector (7) of the motor vehicle body (2) and is received movably on the motor vehicle body (2). The covering element (4) is coupled to the first and second guide rails (8, 9). A third guide rail (10) is transverse to the first and second guide rails (8, 9). The third guide rail (10) is configured to be movable relative to the motor vehicle body (2) and the first and second guide rails (8, 9). The third guide rail (10) is configured to receive the covering element (4), and the covering element can be moved relative to the third guide rail.

10 Claims, 11 Drawing Sheets

(52) U.S. Cl.
CPC .............. *B60K 2015/0515* (2013.01); *B60K 2015/0523* (2013.01); *B60K 2015/0538* (2013.01); *B60K 2015/0561* (2013.01)

(58) Field of Classification Search
CPC .... B60K 2015/0538; B60K 2015/0561; B60L 53/16; B60J 7/057; E05Y 2900/534; Y02T 90/14
USPC .............................. 296/97.22, 223; 320/109
See application file for complete search history.

(56) References Cited

U.S. PATENT DOCUMENTS

| | | |
|---|---|---|
| 9,895,985 B2 | 2/2018 | Takahashi et al. |
| 2012/0286541 A1 | 11/2012 | Kashiwagi |

FOREIGN PATENT DOCUMENTS

| | | |
|---|---|---|
| DE | 44 40 814 | 5/1996 |
| DE | 199 35 454 | 5/2001 |
| DE | 10 2015 206 715 | 10/2016 |
| DE | 10 2014 016 911 | 10/2017 |
| DE | 10 2016 011 869 | 4/2018 |
| DE | 10 2017 212 397 | 1/2019 |
| JP | 2016-097757 | 5/2016 |

OTHER PUBLICATIONS

Chinese Search report dated Jan. 27, 2022.
Japanese Office Action dated Feb. 24, 2021.

\* cited by examiner

COVER APPARATUS FOR A MOTOR VEHICLE BODY

CROSS REFERENCE TO RELATED APPLICATION

This application claims priority under 35 USC 119 to German Patent Appl. No. 10 2019 109 713.4 filed on Apr. 12, 2019, the entire disclosure of which is incorporated herein by reference.

BACKGROUND

Field of the Invention

The invention relates to a cover apparatus for a motor vehicle body.

Related Art

Cover apparatuses for motor vehicle bodies are known and include filler caps that cover a receptacle opening that can receive a fuel nozzle. The receptacle opening connects to a flow duct that is connected to a container for receiving liquid fuel.

Cover apparatuses also are used with battery-operated motor vehicles to cover a charging socket.

The known cover apparatuses predominantly have a complicated kinematic system and/or a predominantly visible kinematic system and, as a result, a kinematic system that is susceptible to dirt. These kinematic systems can be actuated manually or electrically, with the result that a specifically adapted kinematic system is necessary for the two actuating types. For example, a complicated emergency opening means often has to be provided for use if the electric drive fails.

DE 44 40 814 A1, DE 199 35 454 C2 and U.S. Pat. No. 8,089,228 disclose cover apparatuses for filler caps or filler flaps. These filler caps or filler flaps have guide rails that are fixed on a motor vehicle body and in which the filler cap or with the aid of which the filler flap can be moved. The receptacle opening is opened by initially moving the filler cap or the filler flap in the direction of a vehicle body transverse axis and subsequently in the direction of a vehicle body longitudinal axis.

DE 10 2015 206 715 A1 and DE 10 2016 011 869 A1 each disclose a cover apparatus for a charging socket. These covers are configured to be moved with the aid of guide rails that are connected rigidly to the motor vehicle body.

DE 10 2014 016 911 B4 discloses a cover apparatus for a filler cap. A guide rail for moving the filler cap is connected fixedly to the motor vehicle body, and a further guide rail is connected to the motor vehicle body such that it can be moved relative to the motor vehicle body but cannot be moved relative to the filler cap.

An object of the invention is to provide an improved cover apparatus for a motor vehicle body.

SUMMARY

The invention relates to a cover apparatus for a motor vehicle body, having a movement device comprising a first guide rail and a second guide rail that are spaced apart from one another. The first and second guide rails are received rigidly on the motor vehicle body. The cover apparatus has a covering element that covers a filling connector of the motor vehicle body with respect to the surroundings. The covering element is received movably on the motor vehicle body and is coupled to the guide rails. According to the invention, to move the covering element, a third guide rail is configured to receive the covering element. The third guide rail is configured transversely with respect to the first guide rail and with respect to the second guide rail. The third guide rail is configured to be moved at least relative to the motor vehicle body and the guide rails and relative to the covering element. An advantage of the invention is the provision of a simple kinematic system for movement of the covering element. The kinematic system is virtually jam-free in view of the third guide rail that can be moved relative to the two fixed guide rails and the covering element.

Prevention of the jamming is secured further if the covering element is configured such to be moved with the third guide rail. This can be realized, for example, by having the third guide rail coupled to the first guide rail or second guide rail, and by having the covering element operatively connected at the coupling point to the third guide rail, and therefore to the first or second guide rail. In this way, movement of the third guide rail moves the covering element both in the third guide rail and in the first or second guide rail. In this way, the movement of the covering element can be brought about with the aid of the third guide rail.

The third guide rail may be configured on a movable adjusting element of the movement device. The adjusting element can be moved rotationally and/or translationally.

Jamming as a result of an additional rotational movement can be avoided by having the adjusting element received on an actuating element that is received in a linear rail such that it can be moved translationally. In this way, a translational movement of the adjusting element is initiated due to the connection of the actuating element and the adjusting element. The third guide rail is on the adjusting element and is transverse to the adjusting element. Thus, the covering element can be moved in the direction of the linear rail and in the direction of the third guide rail, which is transverse to the direction of the linear rail. Accordingly, a movement of the covering element in the direction of the vehicle body longitudinal axis can be brought about in a simple way with the aid of the linear rail, and can be brought about in a simple way in the direction of the vehicle body transverse axis with the aid of the third guide rail.

The covering element may have at least one holding arm that is received movably in the third guide rail. The holding arm may extend transverse to the predominant extent of the covering element. Thus, attachment points between the guide rails of the movement device and the covering element will have a low frictional loss. Therefore, an approximately punctiform contact or a small linear contact in comparison with a longitudinal extent of the covering element will exist between the guide rails and the covering element, and this contact facilitates displacement as a result of the reduction of frictional areas that make contact with one another.

A secured guidance can be enhanced by a fourth guide rail that is movable and that movably receives the second holding arm. The fourth guide rail achieves a further secured and reduced-friction movement of the covering element, since the holding arm can be guided at a further attachment point by the fourth guide rail.

The guide rails may be configured in the form of a slotted guide. In this way, guide elements, such as guide pins, can be received in the grooves of the guide rails. These guide elements serve for simple coupling between the first guide rail, the third guide rail and the covering element and/or the simple coupling between the second guide rail, the fourth guide rail and the covering element with a low friction.

The movement device can be activated manually and/or electrically. An advantage is that the movement device is retained, as following exemplary embodiments show, and merely a few components are replaced or dispensed with.

The cover apparatus can be positioned in a space-saving manner below an outer skin of the motor vehicle body. As a result, the movement device also is completely below the outer skin and is not visible from the surroundings, preferably in the direction of a vehicle body vertical axis above the filling connector.

Concealing the movement apparatus behind the outer skin provides a freedom of design of the motor vehicle body, and this freedom of design is independent of the design of the filling connector. Contamination of the movement apparatus also is reduced, thereby achieving a longer service life of the movement apparatus. A further advantage of the cover apparatus is that the actuation can take place both manually and with the aid of an electric drive. Thus, simple manually actuation is possible in the case of a failure of said electric drive. Furthermore, no changes have to be made to the motor vehicle body in the case of a change of the electric drive to the manual drive, and vice versa. In this way, the cover apparatus can be produced inexpensively in a high quantity independently of its drive.

The covering element does not protrude transversely with respect to the motor vehicle body during a filling or charging operation, and thus is not apt to get snagged.

Further advantages, features and details of the invention result from the following description of preferred exemplary embodiments and using the drawings. The features and combinations of features mentioned above and the features and combinations of features mentioned in the description of the figures and/or shown in the figures alone can be used not in the respective specified combination and also in other combinations or on their own, without departing from the scope of the invention. Identical or functionally identical elements are assigned identical designations. For reasons of clarity, it is possible that the elements are not provided with their designation in all figures, without losing their assignment, however.

DETAILED DESCRIPTION

Figure 1:
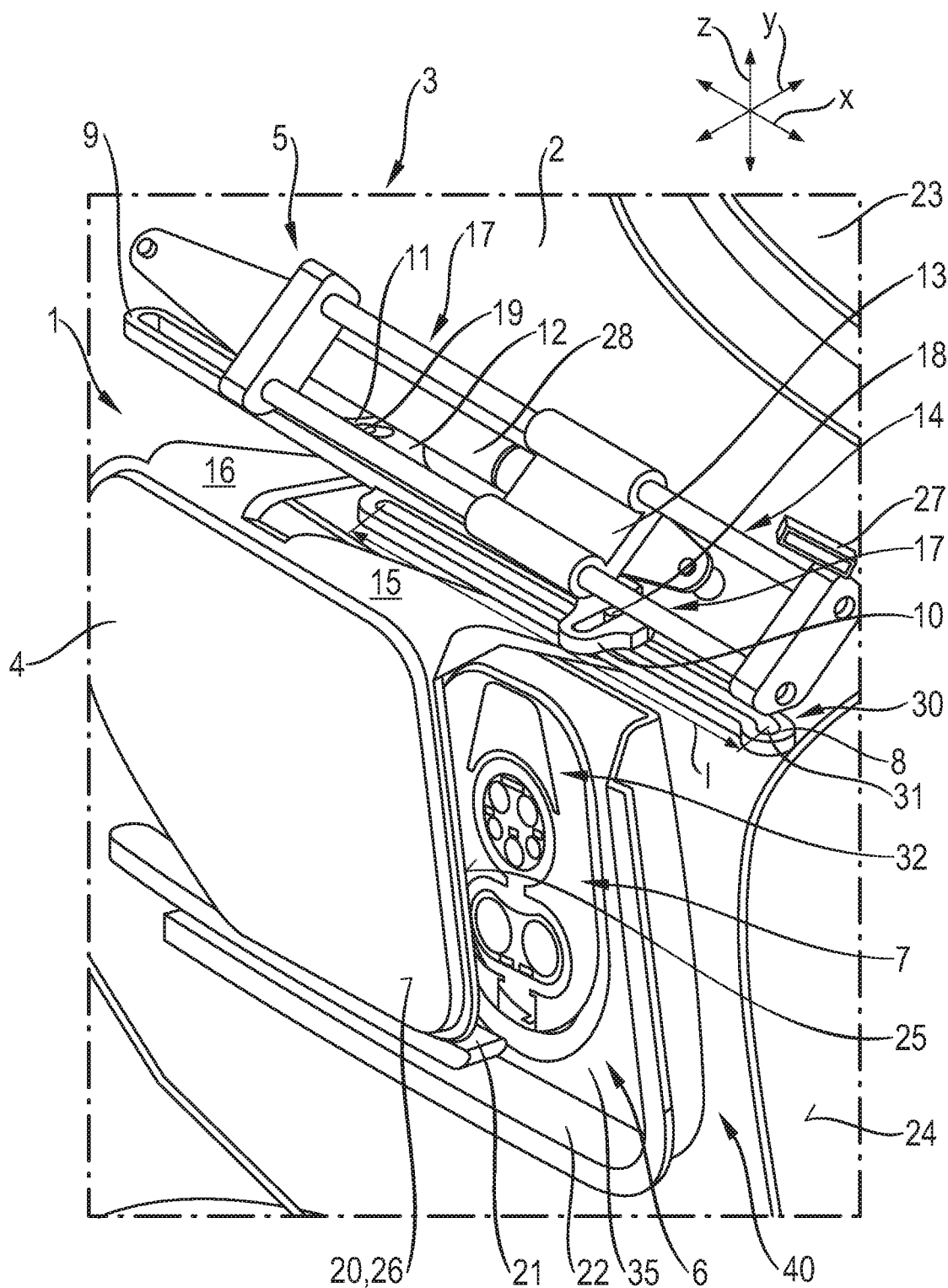
FIG. 1 is a perspective illustration of a cover apparatus according to the invention for a motor vehicle body in a first embodiment.
Figure 2:
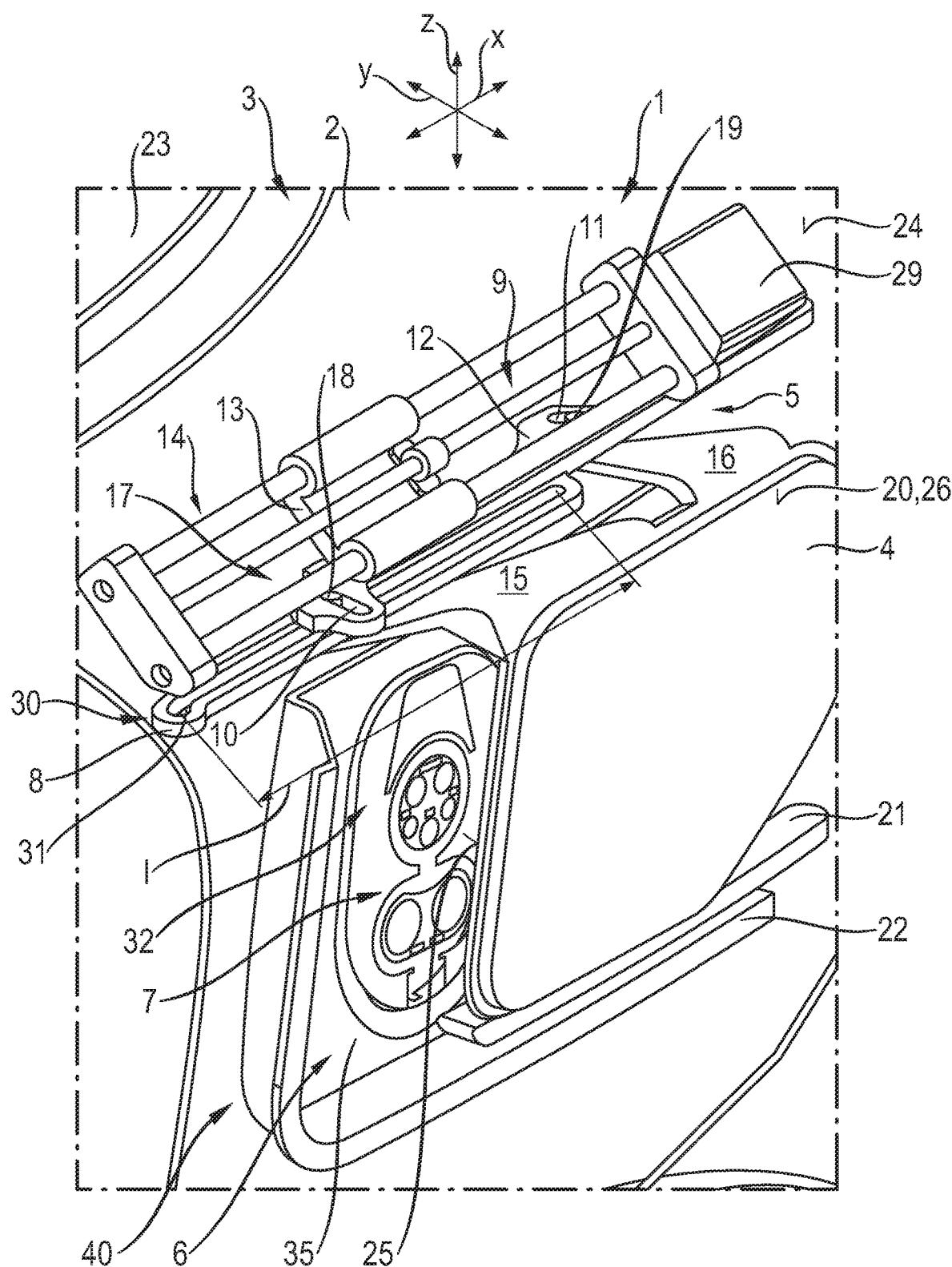
FIG. 2 is a perspective illustration of the cover apparatus according a second embodiment.
Figure 3:
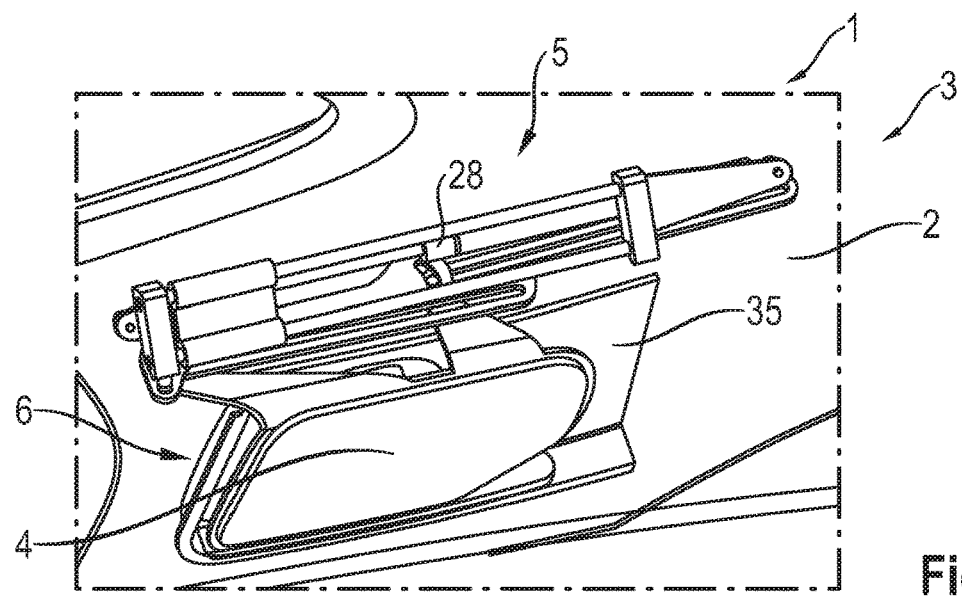
FIG. 3 is a perspective illustration of the cover apparatus of FIG. 1 in a closed position of a receptacle opening.
Figure 4:
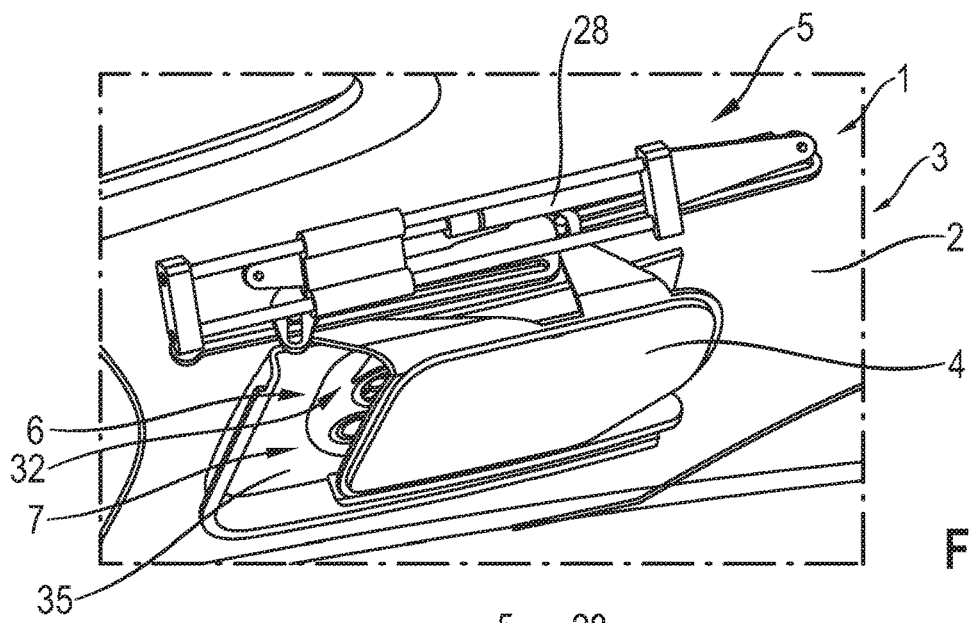
FIG. 4 is a perspective illustration of the cover apparatus of FIG. 1 in an intermediate position.
Figure 5:
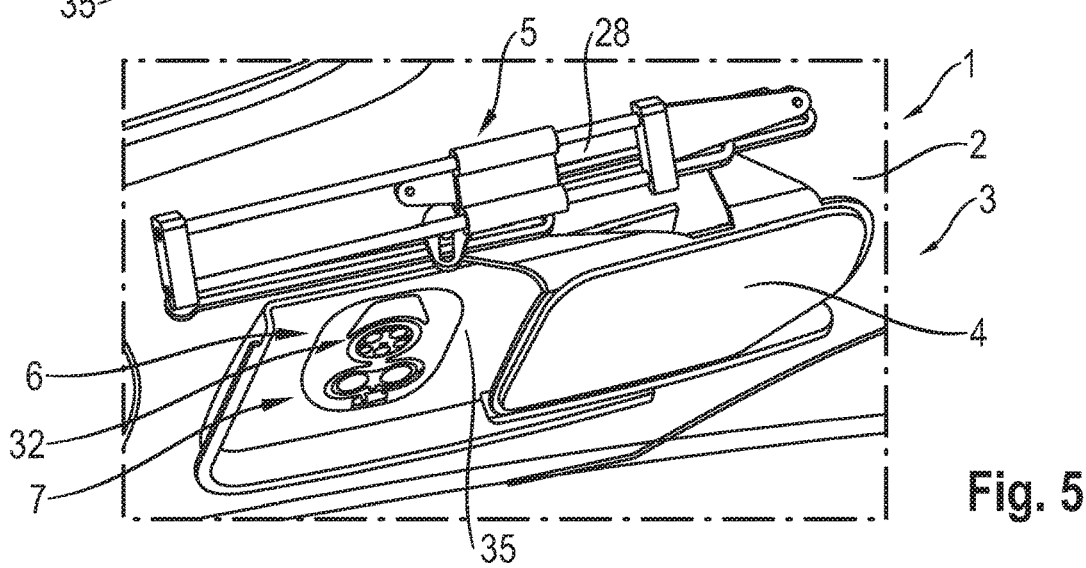
FIG. 5 is a perspective illustration of the cover apparatus of FIG. 1 in a position, in which the receptacle opening is released completely.
Figure 6:
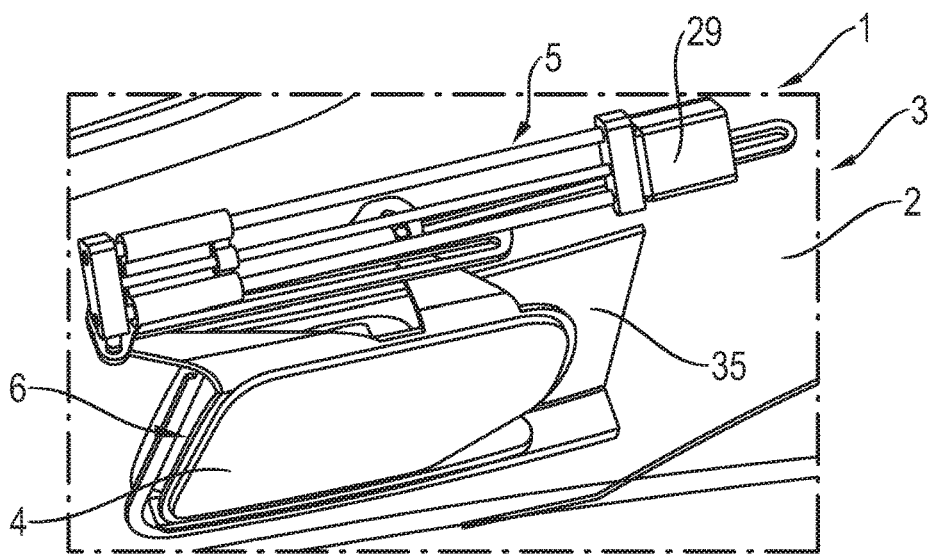
FIG. 6 is a perspective illustration of the cover apparatus of FIG. 2 in a closed position of the receptacle opening.
Figure 7:
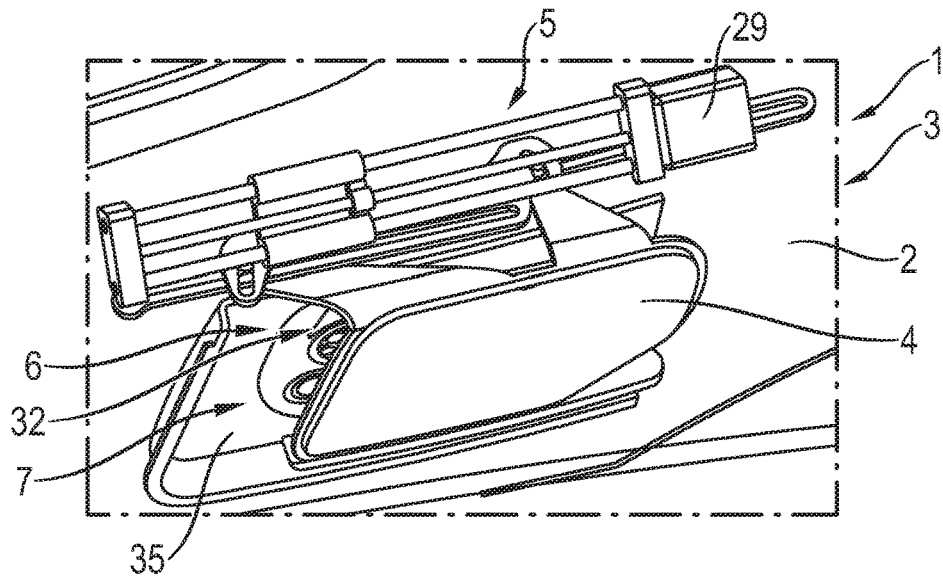
FIG. 7 is a perspective illustration of the cover apparatus of FIG. 2 in an intermediate position.
Figure 8:
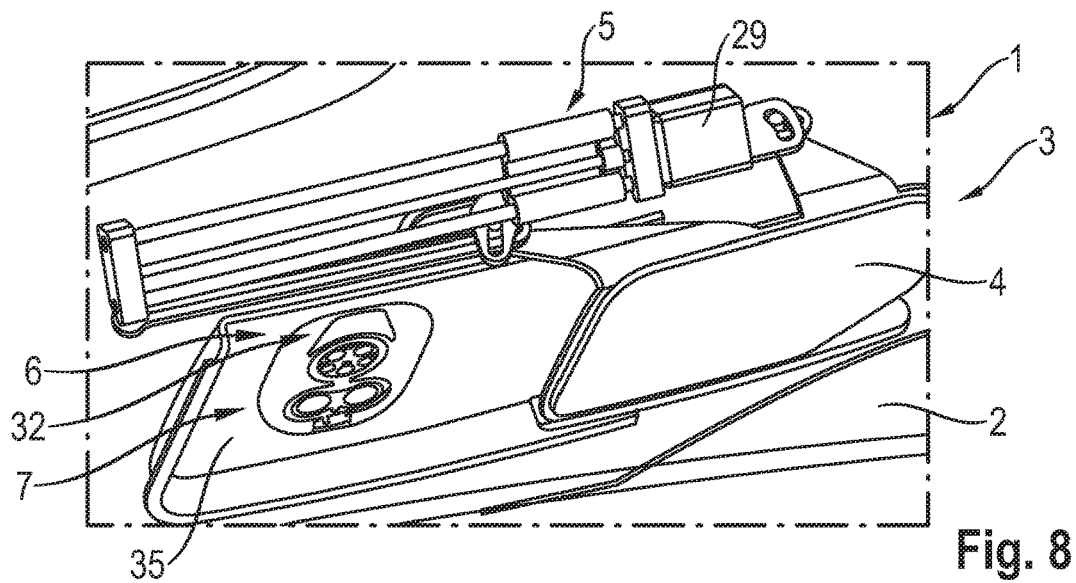
FIG. 8 is a perspective illustration of the cover apparatus of FIG. 2 in a position, in which the receptacle opening is released completely.

A first embodiment of a cover apparatus 1 for a motor vehicle body 2 of a motor vehicle 3 is illustrated in FIG. 1. The cover apparatus 1 has a movable covering element 4 and a movement device 5, with the aid of which the covering element 4 can be moved relative to the motor vehicle body 2.

The covering element 4 is provided for covering a filling connector 7 of an energy supply element (not shown in greater detail). In this embodiment, the filling connector 7 is arranged on a receptacle element 35 of shell-like configuration that is configured so as to lie opposite the covering element 4. The receptacle element 35 is arranged in a vehicle body opening 40 of the motor vehicle body 2 and, in the installed state, is fixed with respect to the motor vehicle body 2.

The receptacle element 35 has a receptacle opening 6 that is configured for receiving the energy supply element and can be closed completely or partially by way of the covering element 4. Furthermore, the receptacle element 35 has a shell-like configuration that is configured as a carrier of a filling gauge 32.

In the illustrated embodiment, the energy supply element is a filling connector 7 in the form of a plug that is configured as a plug-in apparatus. The filling connector 7 is connected to a drive unit of the motor vehicle 3 in the form of a battery. However, the filling connector also could be a fuel nozzle, the drive unit could be an internal combustion engine and a tank could be provided to receive liquid fuel.

The movement device 5 comprises a first guide rail 8 and a second guide rail 9 that are spaced apart and parallel to one another. The two guide rails 8, 9 extend predominantly in the direction of a vehicle body longitudinal axis x, and are offset with respect to one another in the direction of a vehicle body transverse axis y and a vehicle body vertical axis z. The guide rails 8, 9 overlap over their guide length l. Thus, each of the two guide rails 8, 9 has the guide length l, and it is not necessary for a value of the guide length l of the guide rails 8, 9 to be identical. As a result, the guide rails 8, 9 overlap over a region that is smaller than or equal to their guide length l.

The movement device 5 further comprises a third guide rail 10 and a fourth guide rail 11 that are transverse to the first guide rail 8 and the second guide rail 9. Therefore, the covering element 4 can be moved in the direction of the vehicle body longitudinal axis x with the aid of the first guide rail 8 and the second guide rail 9, and can be moved in the direction of the vehicle body transverse axis y with the aid of the third guide rail 10 and the fourth guide rail 11.

The third guide rail 10 and the fourth guide rail 11 can be moved relative to the first guide rail 8 and the second guide rail 9, which are arranged rigidly on the motor vehicle body 2. Furthermore, the third guide rail 10 and the fourth guide rail 11 are connected rigidly to one another with the aid of an adjusting element 12. In this way, the third and fourth guide rails 10 and 11 carry out a common movement.

The adjusting element 12 is coupled to an actuating element 13 that is configured to be displaced linearly in the direction of the vehicle body longitudinal axis x with the aid of a linear rail 14. Thus, a displacement of the actuating element 13 causes a corresponding translational movement of the adjusting element 12.

The covering element 4 is of plate-shaped configuration and is arranged in a manner that faces the movement device 5. The covering element 4 has a first holding arm 15 and a second holding arm 16 that extend into and connect to the movement device 5. The holding arms 15, 16 are attached to an inner face 25 of the covering element 4, and the inner face 25 faces the receptacle opening 6.

First and second guide elements 18, 19 are arranged respectively at the ends 17 of the holding arms 15, 16 that face away from the covering element 4 and serve for positive guidance of the covering element 4 in the guide rails 8, 9, 10, 11.

The first guide element 18 is on the first holding arm 15 and engages into both the first guide rail 8 and the third guide rail 10. The third guide rail 10 is above the first guide rail 8 in the direction of the vehicle body vertical axis z. In this way, the first guide element 18 can be moved in the first guide rail 8 along the vehicle body longitudinal axis x, and in the third guide rail 10, which extends transverse to the first guide rail 8 predominantly in the direction of the vehicle body transverse axis y. The third guide rail 10 also is set in the direction of the vehicle body vertical axis z.

To achieve a flush arrangement of the covering element 4 with the motor vehicle body 2 in the closed position where the covering element 4 closes the receptacle opening 6 completely, an end 30 of the first guide rail 8 has an eye 31 that extends in the direction of the covering element 4 at its end 30 to limit the closing movement. More particularly, the first guide rail 8 has a curvature at its end 30, and the curvature is configured in the direction of the covering element 4 so that the outer face 26 of the covering element 4 can be arranged flush with the outer skin 24 in the closed position. The eye 31 is oriented in the direction of the surroundings or in the direction of the covering element 4 and is necessary, since, in the open position, the covering element 4 is arranged behind an outer skin 24 of the motor vehicle body 2 as viewed from the outside.

The second guide element 19 is arranged on the second holding arm 16 in a functionally identical manner. More particularly, the second guide element 19 is arranged to engage both into the second guide rail 9 and into the fourth guide rail 11. To this end, the fourth guide rail 11 is above the second guide rail 9 in the direction of the vehicle body vertical axis z. In this way, the second guide element 19 can be moved in the second guide rail 9 along the vehicle body longitudinal axis x, and in the fourth guide rail 11, which extends transverse to the second guide rail, predominantly in the direction of the vehicle body transverse axis y. In the case of the fourth guide rail 11 also is set in the direction of the vehicle body vertical axis z.

For secured guidance, the covering element 4 has an element bar 21 on its element face 20 that faces away from the holding elements 18, 19. The element bar 21 is arranged to engage into a supporting rail 22 that delimits the receptacle opening 6 and is formed with the aid of the receptacle element 35.

With the aid of the guide rails 8, 9, 10, 11, the covering element 4 can be positioned, starting from its closed position, along the vehicle body transverse axis y in the direction of a vehicle body interior space 23, and therefore below the motor vehicle body 2. Thus, the covering element 4 can be displaced below the outer skin 24 of the motor vehicle body 2 to open the receptacle opening 6. If the receptacle opening 6 is covered, an outer face 26 of the covering element 4 is arranged flush with the outer skin 24.

FIGS. 1 to 8 should not be understood such that the movement apparatus 5 is arranged in front of the outer skin 24, and is therefore visible. Rather the movement apparatus 5 is behind the outer skin 24 so as to face the vehicle body interior space 23 in the direction of the vehicle body transverse axis y. The illustrations have been selected for reasons of improved explanation.

The movement device 5 is arranged above the plug-in apparatus 7 in the direction of the motor vehicle vertical axis z and is configured so as not to be visible from the outside even in the case of an open receptacle opening 6.

Figure 17:
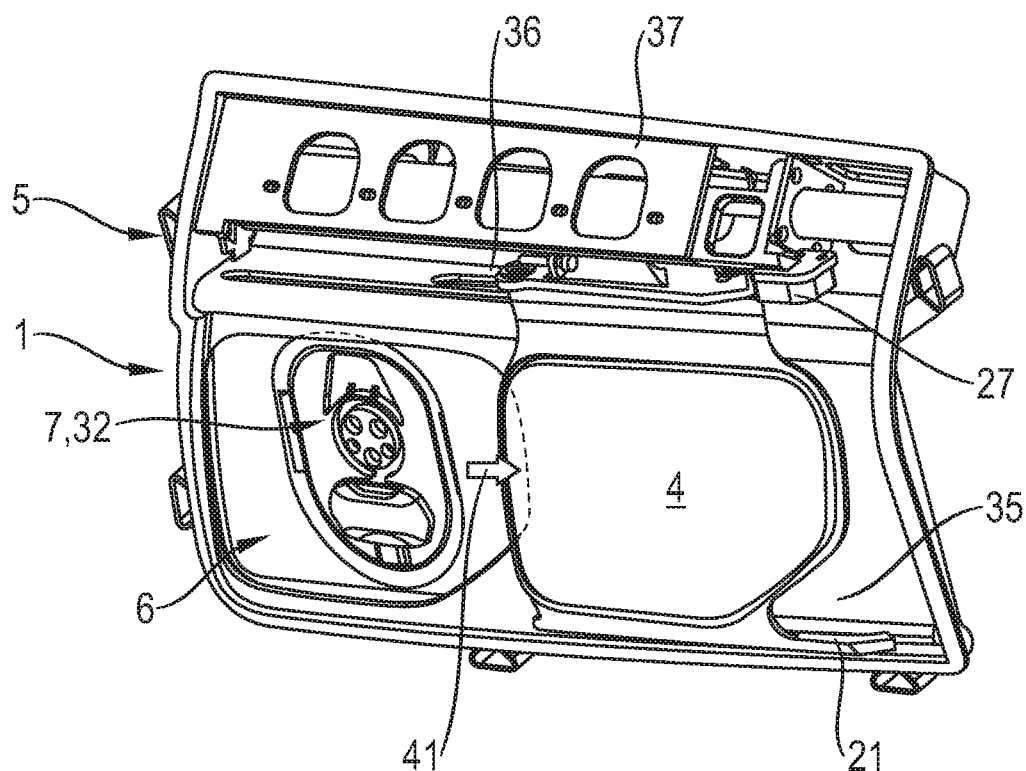
FIG. 17 is a perspective illustration of the cover apparatus of FIG. 11 in a position, in which the receptacle opening is released completely.
Figure 18:
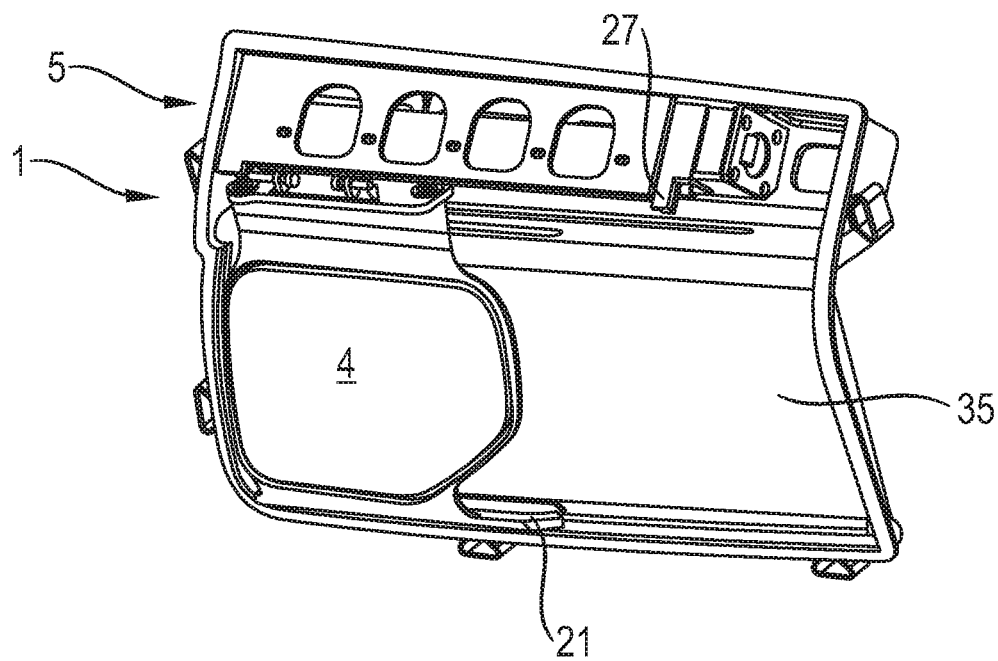
FIG. 18 is a perspective illustration of the cover apparatus of FIG. 13 in a closed position of the receptacle opening.
Figure 19:
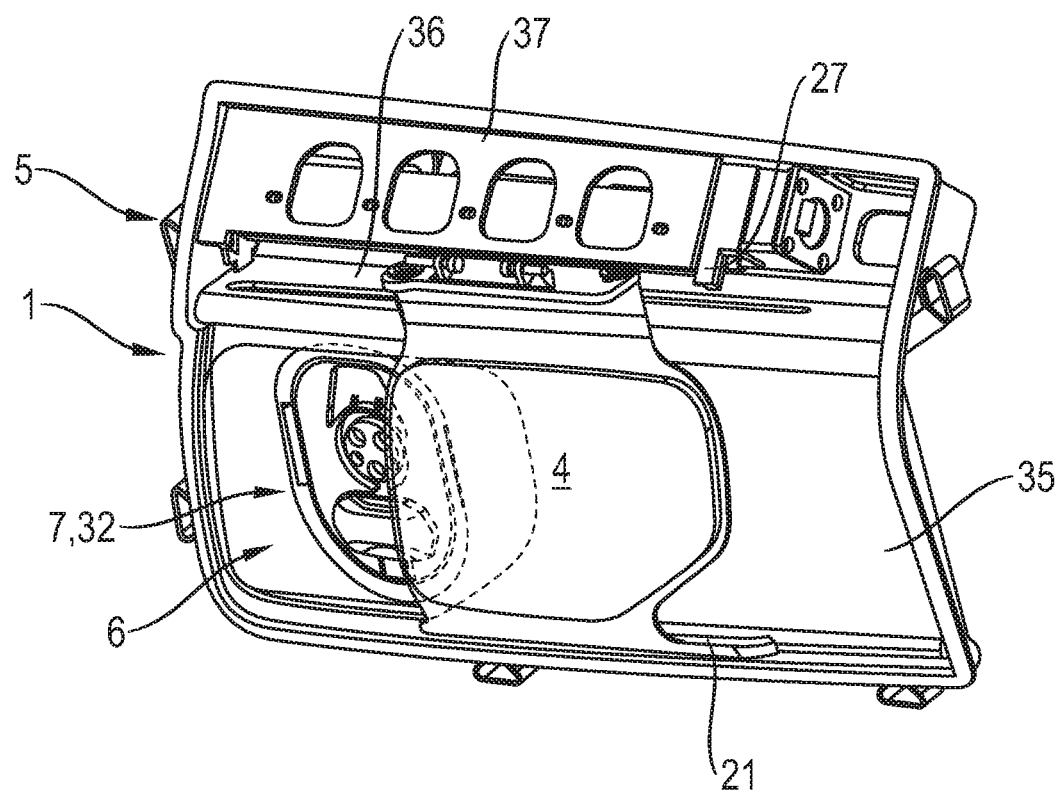
FIG. 19 is a perspective illustration of the cover apparatus according to FIG. 13 in an intermediate position.
Figure 20:
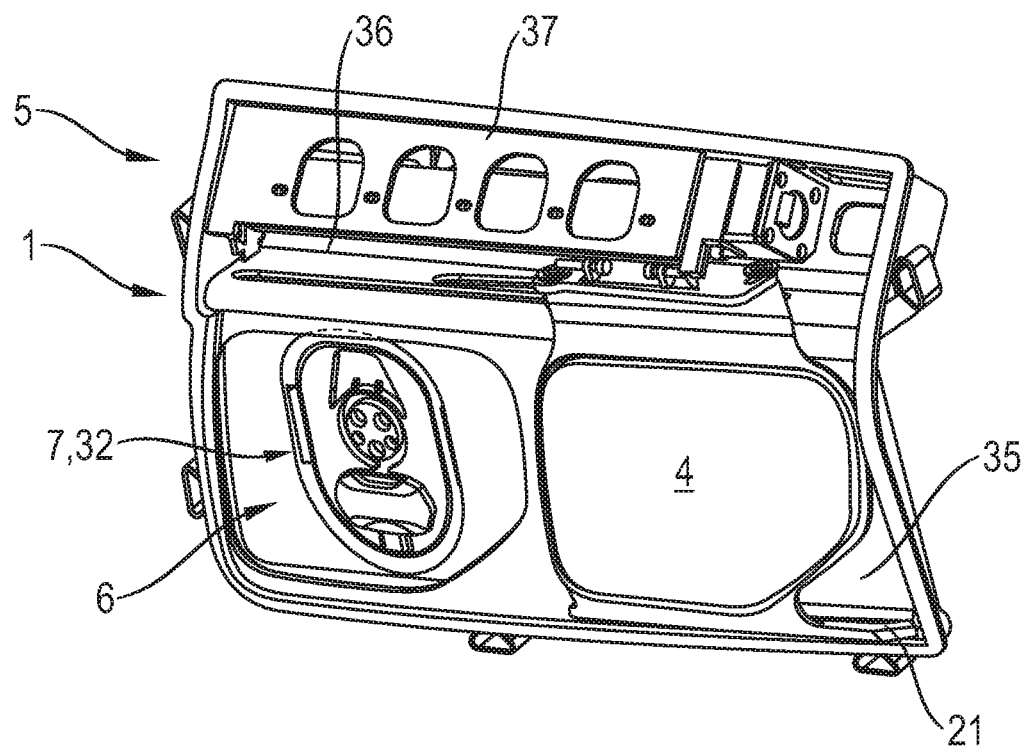
FIG. 20 is a perspective illustration of the cover apparatus of FIG. 13 in a position, in which the receptacle opening is released completely.

In the first embodiment illustrated in FIGS. 1 and 3 to 5, the cover apparatus 1 can be actuated mechanically. To open the receptacle opening 6, the covering element 4 is to be pressed in the direction of the vehicle body transverse axis y, and is to be pushed manually in the direction of the vehicle body longitudinal axis x, until a latching element 27 is reached by way of latching into it. Force is to be exerted counter to a prestressing element 28 in the form of a gas pressure spring. To close the receptacle opening 6, the covering element 4 is to be pressed again against the latching element 27 in its opening direction, indicated with the aid of the arrow 41 in FIG. 17, so that the latching element 27 can be released and the covering element 4 and can move again with the aid of the prestressing element into its position, in which it closes the receptacle opening 6 completely. The latching element 27 preferably is configured in the form of what is known as a push-push element.

Instead of the prestressing element 28 and the latching element 27 configured in the form of a push-push element, a second embodiment of the cover apparatus 1 is illustrated in FIGS. 2, 6 to 8 and 10 and uses an electric drive 29 which, by way of example, comprises a stepping motor as drive element. The movements of the covering element 4 are identical in the two exemplary embodiments, since the movement device 5 is also identical with the exception of the drive.

Figure 9:
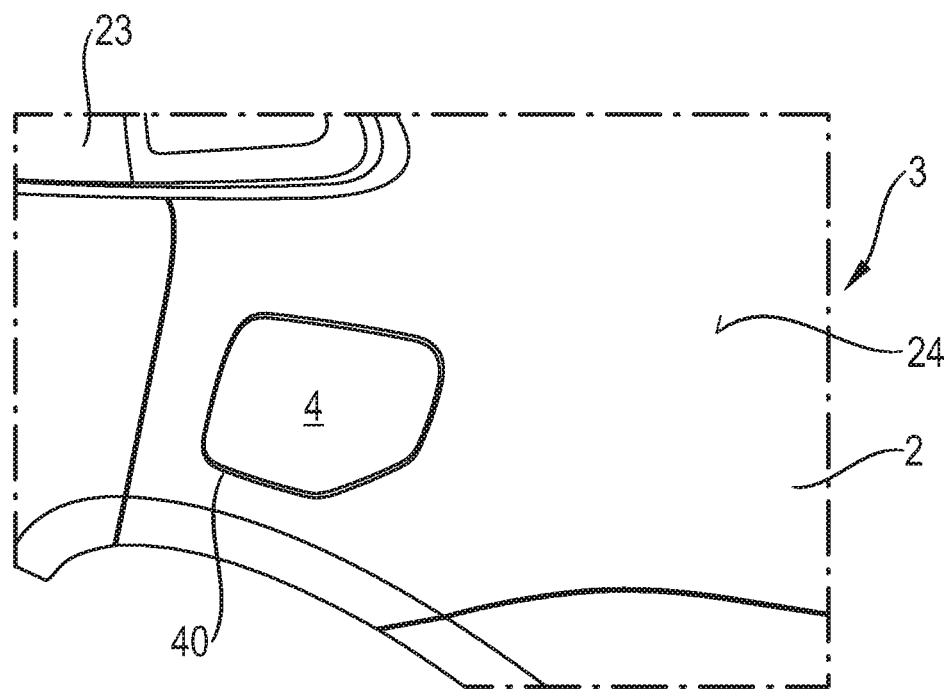
FIG. 9 is a perspective illustration of a detail of the motor vehicle body in the region of the receptacle opening with the covering element that closes the receptacle opening.
Figure 10:
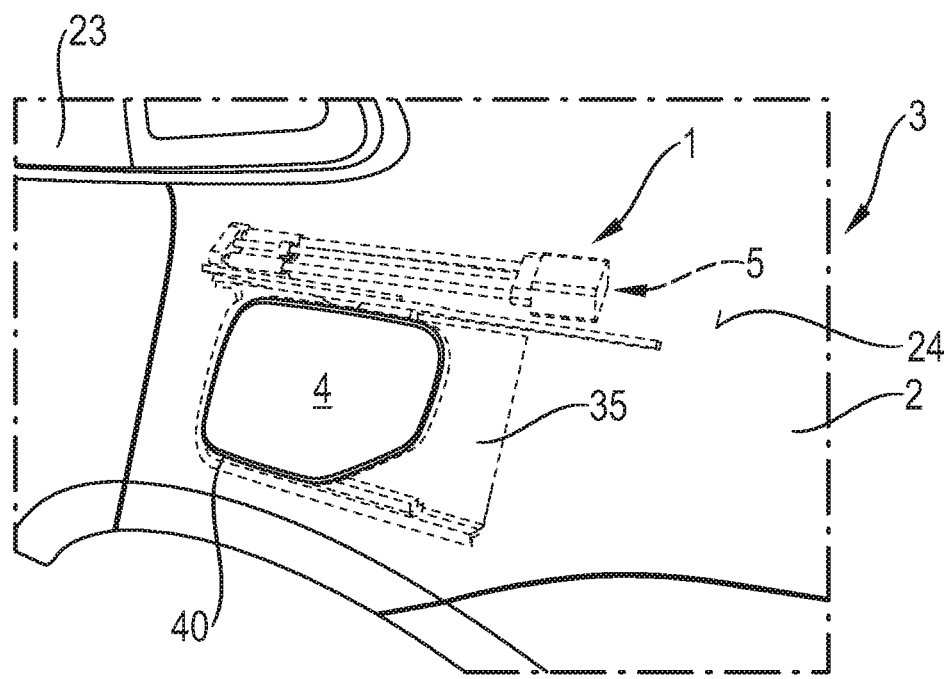
FIG. 10 is a perspective transparent illustration of the detail of the motor vehicle body of FIG. 9 with the cover apparatus according to the second embodiment.

FIGS. 9 and 10 serve for improved explanation. FIG. 9 illustrates the motor vehicle body 2 with the closed receptacle opening 6, and FIG. 10 shows a transparent illustration of the motor vehicle body 2 to make the arrangement of the cover apparatus 1 visible in the case of a closed receptacle opening 6 using the example of the second embodiment. It can thus be shown that the movement device 5 and at least the holding arms 15, 16 are always positioned completely below the outer skin 24, and thus between the outer skin 24 and the vehicle body interior space 23, both in the case of a closed receptacle opening 6 and even in the case of a merely partially open or completely open receptacle opening 6. Accordingly, the cover apparatus 1 can be arranged completely on an inner face of the motor vehicle body 2 and hence facing away from the outer skin 24.

In a further refinement of the cover apparatus 1, a translucent charging tray can be provided to shine through in the direction of the outer skin 24.

Figure 11:
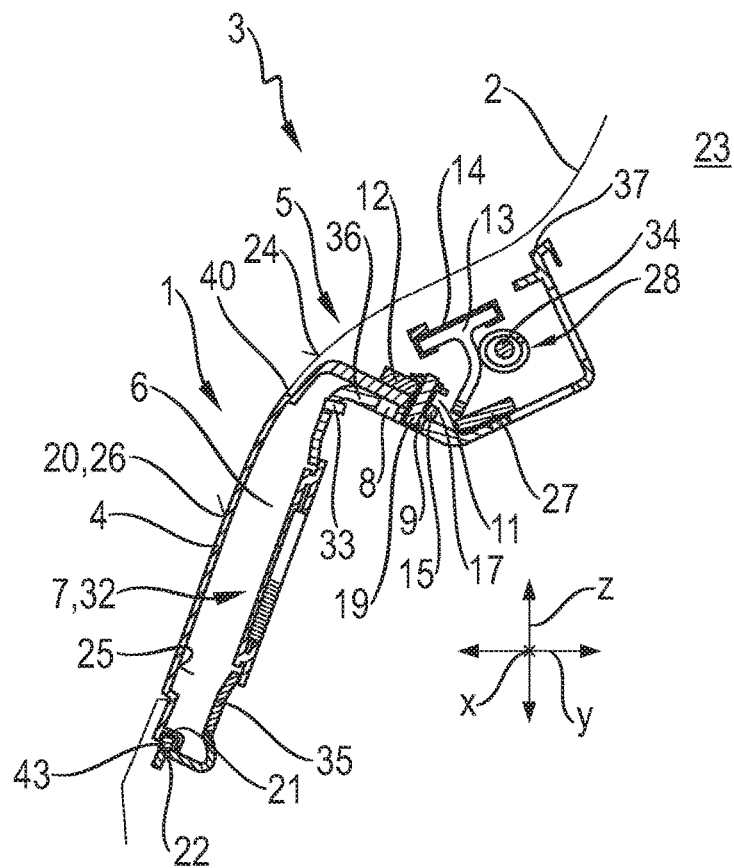
FIG. 11 is a section along a motor vehicle transverse axis of the cover apparatus according to the invention in a third embodiment.
Figure 12:
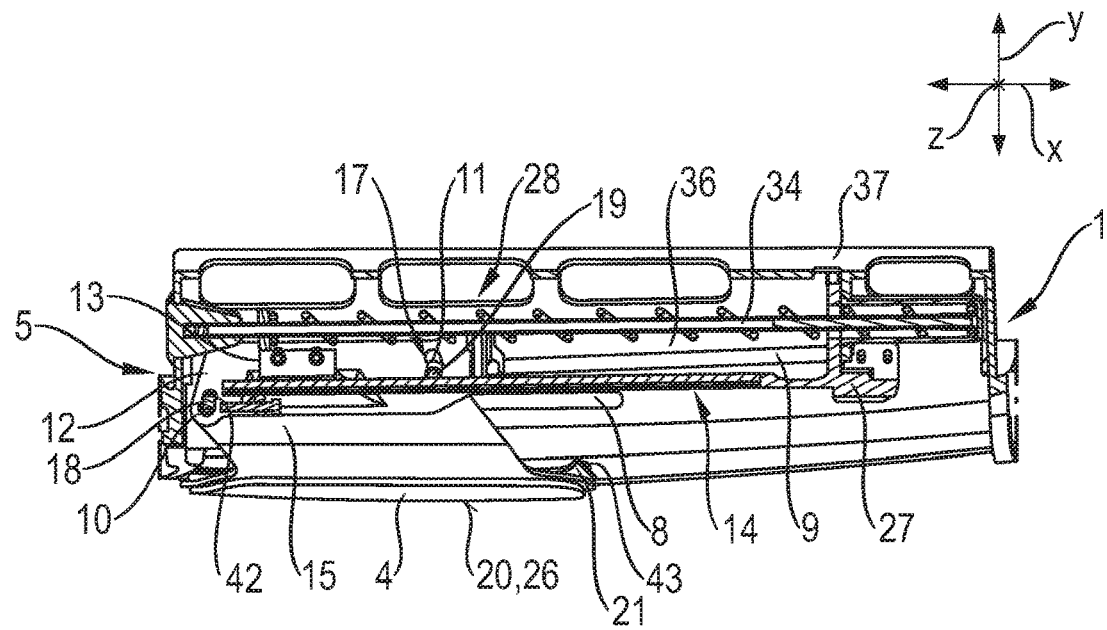
FIG. 12 is a plan view of the cover apparatus of FIG. 11.

FIGS. 11 and 12 illustrate the cover apparatus 1 according to the invention in accordance with a third embodiment. As is the case with the cover apparatus 1 of the first embodiment, the cover apparatus 1 can be actuated mechanically. The receptacle element 35 has an element carrier 36 that extends in the direction of the vehicle body interior space 23. It is arranged more or less perpendicularly on the receptacle element 35, and is in one piece with the receptacle element 35.

The element carrier 36 has the first guide rail 8 and the second guide rail 9 in an integrated manner. More particularly, the guide rails 8, 9 are configured in one piece with the element carrier 36. However, the guide rails 8, 9 can be produced independently of the element carrier 36, and then received on the element carrier 36.

In this embodiment, the second guide rail 9 is inclined slightly with respect to the first guide rail 8, as a result of which a movement in the direction of the vehicle body transverse axis y is ensured in a simple way.

The covering element 4 of the third embodiment has a single holding arm 15 for guidance purposes. The first guide element 18 is at its arm end 17 to be spaced away from the second guide element 19 at least in the direction of the motor vehicle longitudinal axis x. However, the covering element 4 of the third embodiment can have two holding arms 15, 16 for receiving the guide elements 18, 19. The holding arms 15, 16 of the first and the second embodiments might be configured as a single holding arm 15. For the exact guidance of the covering element 4 along the guide rails 8, 9, the configuration of at least two guide elements 18, 19 on the holding arm 15, which can be one piece or two pieces is preferred so that movement of the covering element 4 can be realized without jamming in the direction of the vehicle body longitudinal axis x and in the direction of the vehicle body transverse axis y.

The prestressing element 28 (configured in the form of a spiral spring) of the third embodiment is supported on a guide rod 34 that extends in the direction of the vehicle body longitudinal axis x, as can be gathered from FIG. 12.

Above the filling gauge 32 in the direction of the motor vehicle vertical axis z, the receptacle element 35 has an illumination element 33 in the form of an LED light strip for improved visibility of the filling gauge 32. The illumination element 33 is actuated with the aid of a control element 42 in the form of a switch that is actuated when the closed position of the covering element 4 is reached or left.

The element bar 21 of the covering element 4 of the third embodiment further has a third guide element 43 in the form of a cylindrical pin that is configured to engage into the supporting rail 22.

Figure 13:
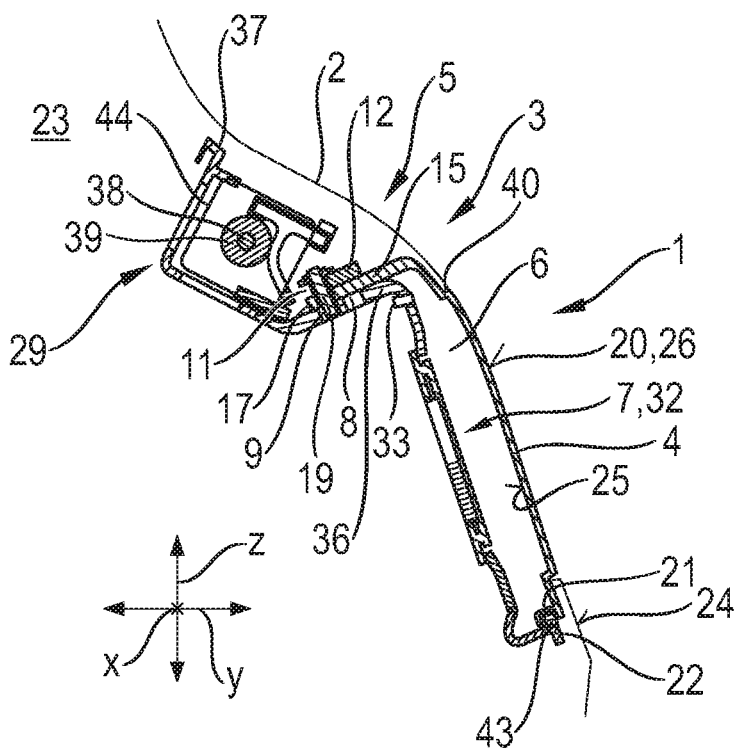
FIG. 13 is a section along a motor vehicle transverse axis of the cover apparatus according to a fourth embodiment.
Figure 14:
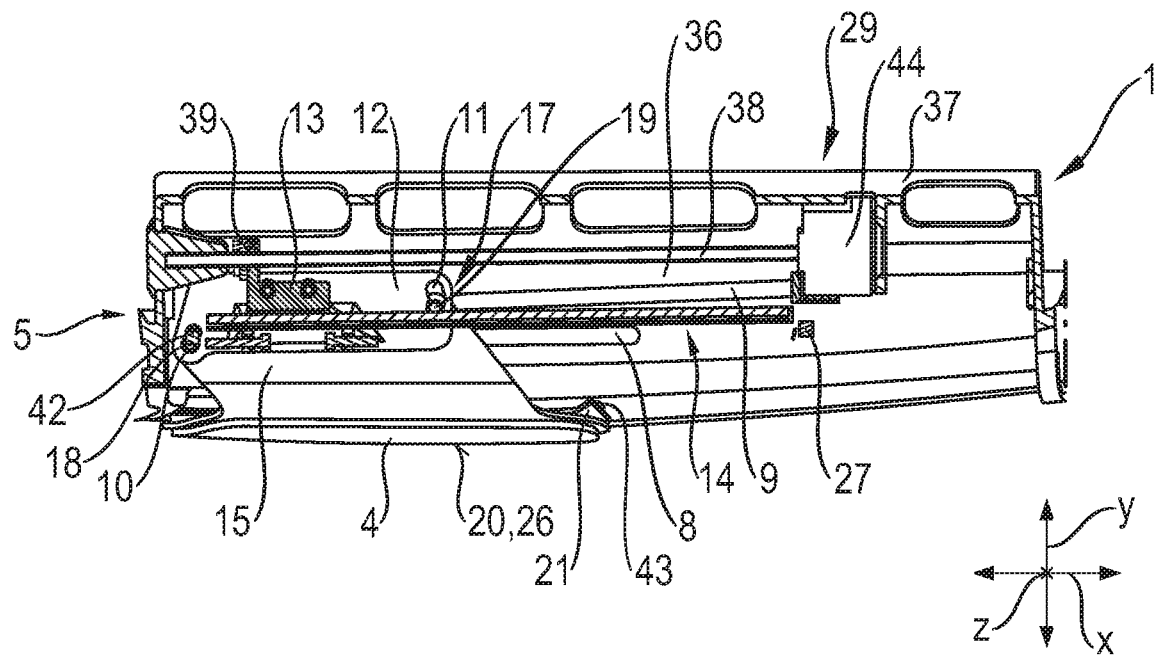
FIG. 14 is a plan view of the cover apparatus of FIG. 13.
Figure 15:
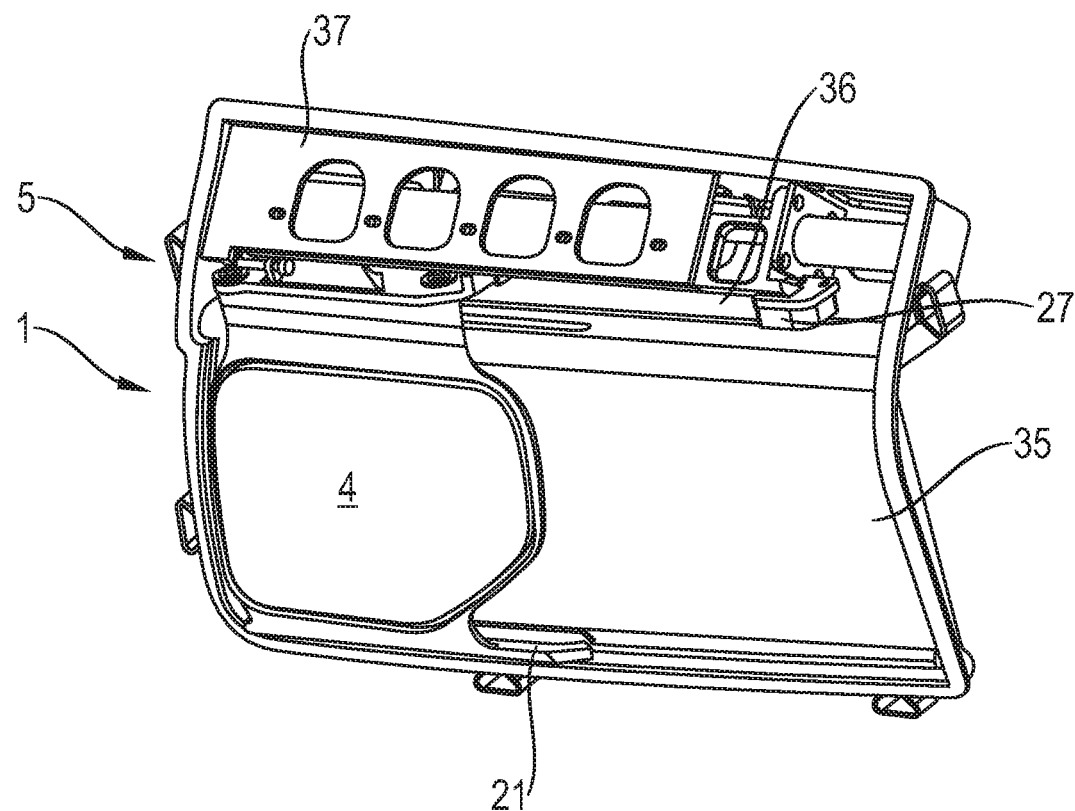
FIG. 15 is a perspective illustration of the cover apparatus of FIG. 11 in a closed position of the receptacle opening.
Figure 16:
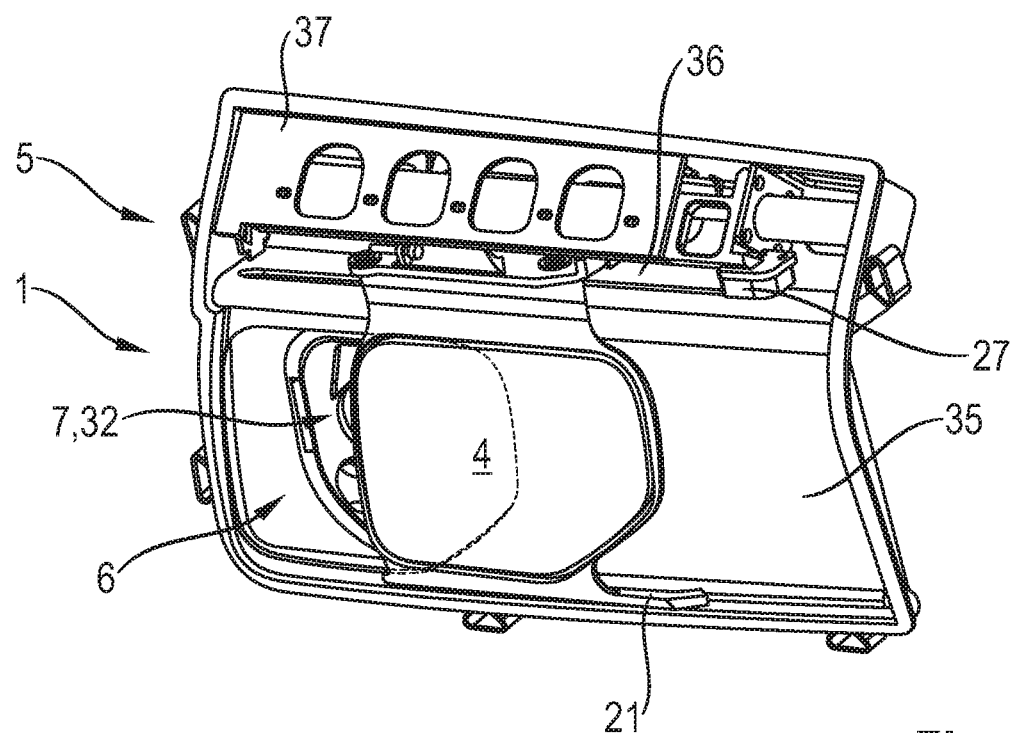
FIG. 16 is a perspective illustration of the cover apparatus of FIG. 11 in an intermediate position.

FIGS. 13 and 14 illustrate the cover apparatus 1 according to a fourth embodiment where an electric drive 29 is provided in contrast to the cover apparatus 1 of the third embodiment. The electric drive 29 has a drive element 44 in the form of the stepping motor. The electric drive 29 also has a drive spindle 38 and a connecting element 39 in the form of a nut that connects the actuating element 13 to the drive spindle 38 and can be moved on and along the drive spindle 38.

FIGS. 15 to 17 and FIGS. 18 to 20 are perspective illustrations of the closed position, the intermediate position and the open position of the cover apparatus of the third embodiment and the fourth embodiment.

Figure 21:
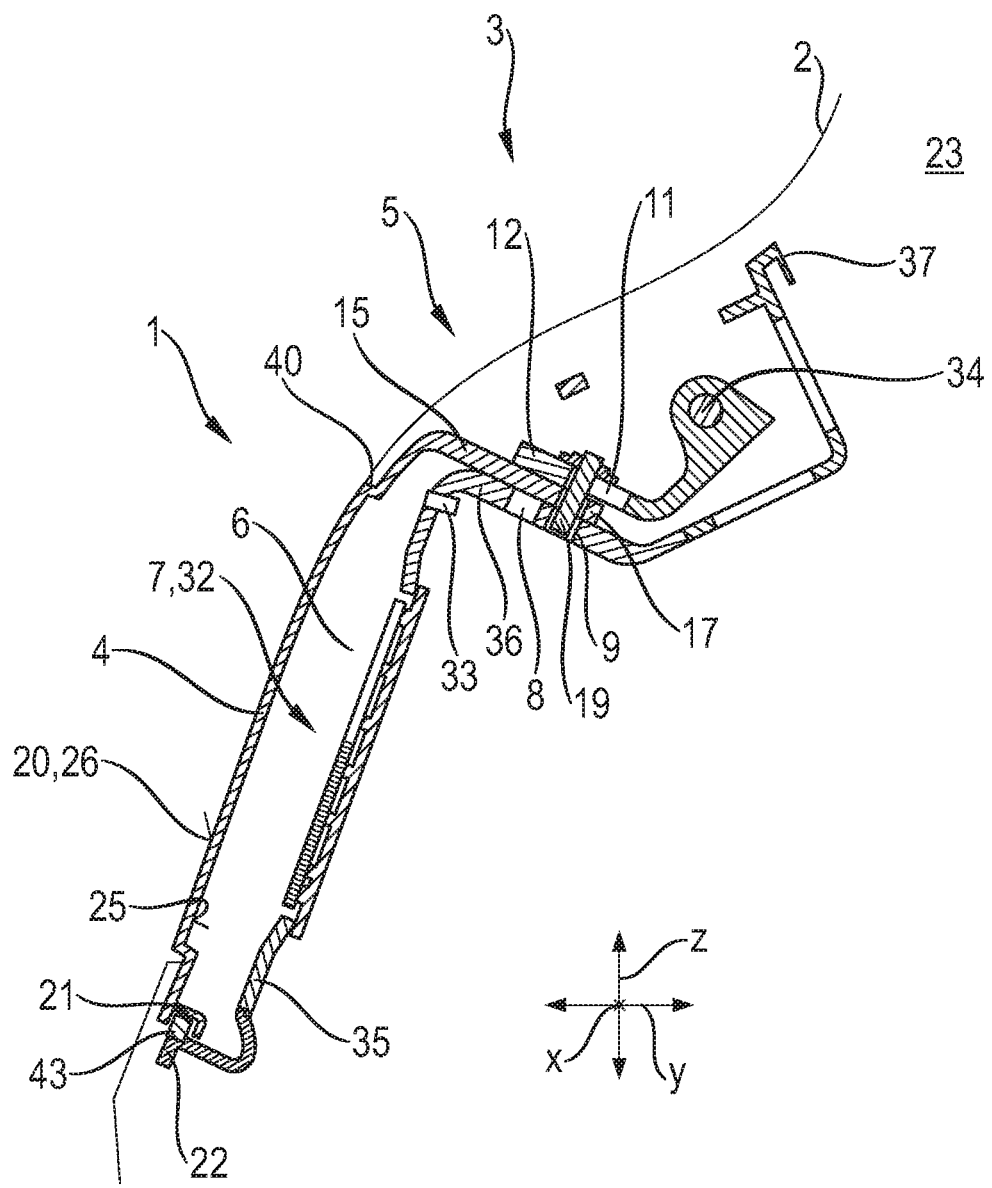
FIG. 21 is a section along a motor vehicle transverse axis of the cover apparatus according to the invention in a fifth exemplary embodiment.

A cover apparatus 1 of a fifth embodiment is shown in FIG. 21 and is substantially in accordance with the third and fourth embodiments. The movement apparatus 5 of the fifth embodiment has the actuating element 13 which, in the case of the electric drive, is driven directly (i.e. immediately) via the drive spindle 38, and therefore without the connecting element 39, or can slide along on the guide rod 34 in the case of the mechanical drive.

The last three embodiments are suitable for simplified assembly of the cover apparatus 1 on account of the guide rails 8, 9 being received on the receptacle element 35 and/or in the case of the configuration of the guide rails 8, 9 in the receptacle element 35 with the aid of the element carrier 36, since the entire cover apparatus 1 in the form of a finished kit that can be assembled is suitable for assembly on the motor vehicle body 2 with the aid of the holder 37. In this way, inexpensive assembly can be achieved, in particular in the case of these embodiments.

What is claimed is:

1. A cover apparatus for a motor vehicle body having an outer skin with a receptacle opening and a filling connector inward of the receptacle opening, comprising:
   a movement device having first and second spaced apart linear guide rails received rigidly on the motor vehicle body inward of the outer skin and extending in a horizontal direction, third and fourth linear guide rails extending transverse to the horizontal direction, the third and fourth guide rails being movable along the first and second guide rails respectively;
   a covering element being selectively movable between a closed position and an open position, the covering element that is in the closed position closing the receptacle opening and covering the filling connector of the motor vehicle body with respect to surroundings, and the covering element that is in the open position being inward of the outer skin and offset from the receptacle opening in the horizontal direction, the covering element having first and second guide elements, the first guide element being movably engaged with the first and third guide rails and the second guide element being movably engaged with the second and fourth guide rails.

2. The cover apparatus of claim 1, wherein the moving device includes a movable adjusting element, the third and fourth guide rails being on the moving device.

3. The cover apparatus of claim 2, wherein the covering element has first and second holding arms, projecting to positions inward of the outer skin, the first guide element projecting from the first holding arm and the second guide element projecting from the second holding arm.

4. The cover apparatus of claim 3, wherein the adjusting element is received on an actuating element that is received in a linear rail such that the adjusting element and the covering element can be moved translationally to a position offset from the receptacle opening and the filling connector.

5. The cover apparatus of claim 3, wherein the first, second, third and fourth guide rails comprise slotted guides.

6. The cover apparatus of claim 5, wherein the first and second guide elements of the covering element are guided in the slotted guides of the first, second, third and fourth guide rails.

7. The cover apparatus of claim 1, wherein the movement device can be activated manually and/or electrically.

8. The cover apparatus of claim 1, wherein the covering element is a charging socket cap.

9. The cover apparatus of claim 1, wherein the cover apparatus can be arranged completely on an inner face of the motor vehicle body, the inner face facing away from an outer skin of the motor vehicle body.

10. The cover apparatus of claim 1, wherein the first and second guide rails are configured to permit movement of the first and second guide elements and the covering element transverse to the longitudinal direction when the covering element is in the closed position.

\* \* \* \* \*